US010571707B2

(12) United States Patent
Yoshida

(10) Patent No.: US 10,571,707 B2
(45) Date of Patent: Feb. 25, 2020

(54) THREE-DIMENSIONAL IMAGE OBSERVATION SYSTEM

(71) Applicant: NATIONAL INSTITUTE OF INFORMATION AND COMMUNICATIONS TECHNOLOGY, Koganei-shi, Tokyo (JP)

(72) Inventor: Shunsuke Yoshida, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 16/300,648

(22) PCT Filed: May 10, 2017

(86) PCT No.: PCT/JP2017/017689
§ 371 (c)(1),
(2) Date: Nov. 12, 2018

(87) PCT Pub. No.: WO2017/195825
PCT Pub. Date: Nov. 16, 2017

(65) Prior Publication Data
US 2019/0146234 A1 May 16, 2019

(30) Foreign Application Priority Data
May 12, 2016 (JP) .................. 2016-096350

(51) Int. Cl.
*G02B 27/22* (2018.01)
*H04N 13/30* (2018.01)
(52) U.S. Cl.
CPC ..... *G02B 27/2292* (2013.01); *G02B 27/2214* (2013.01); *H04N 13/30* (2018.05)

(58) Field of Classification Search
CPC .............. G03B 21/606; G02B 27/2214; G02B 27/2221; G02B 27/2235; G02B 27/2292; H04N 13/00; H04N 13/30
(Continued)

(56) References Cited

U.S. PATENT DOCUMENTS

2007/0223090 A1* 9/2007 Dolgoff .............. G02B 27/2278
359/478
2008/0213090 A1* 9/2008 Hatton .................. B64C 39/064
415/208.1
(Continued)

FOREIGN PATENT DOCUMENTS

JP 2011-48273 A 3/2011
JP 2012-10085 A 1/2012
(Continued)

OTHER PUBLICATIONS

International Search Report dated Jul. 18, 2017, issued in counterpart application No. PCT/JP2017/017689 (2 pages).
(Continued)

*Primary Examiner* — William C. Dowling
(74) *Attorney, Agent, or Firm* — Westerman, Hattori, Daniels & Adrian, LLP; John P. Kong

(57) ABSTRACT

A three-dimensional image observation system includes a three-dimensional display (100) and a guide frame (410). The three-dimensional display is constituted by a light ray controller (1), a plurality of light ray generators (2), a control device (3) and a storage device (4). Further, the three-dimensional display (100) is provided at a table (5). In the three-dimensional display (100), the area where eyes of observers (10) are to be positioned when the observers observe a three-dimensional image is predefined as a viewing area (500), and the guide frame (410) visually guides the eyes of the observers (10) from the outside of the viewing area (500) to the inside of the viewing area.

6 Claims, 9 Drawing Sheets

(58) Field of Classification Search
USPC .... 359/458, 462, 466, 471, 478, 479; 353/7, 353/10
See application file for complete search history.

(56) References Cited

U.S. PATENT DOCUMENTS

| | | | |
|---|---|---|---|
| 2008/0266523 A1* | 10/2008 | Otsuka | G02B 27/2285 353/7 |
| 2011/0316881 A1 | 12/2011 | Yoshifuji et al. | |
| 2012/0146897 A1 | 6/2012 | Yoshida et al. | |
| 2015/0138327 A1 | 5/2015 | Xu | |
| 2015/0301347 A1 | 10/2015 | Juni | |

FOREIGN PATENT DOCUMENTS

| | | |
|---|---|---|
| JP | 2013-21522 A | 1/2013 |
| JP | 2013-26738 A | 2/2013 |
| JP | 5187639 B2 | 4/2013 |
| JP | 2014-106354 A | 6/2014 |

OTHER PUBLICATIONS

Yoshida, "Implementations toward Interactive Glasses-free Tabletop 3D Display", National Institute of Information and Communications Technology (NICT), Aug. 2014 (1 page).

* cited by examiner

F I G 1
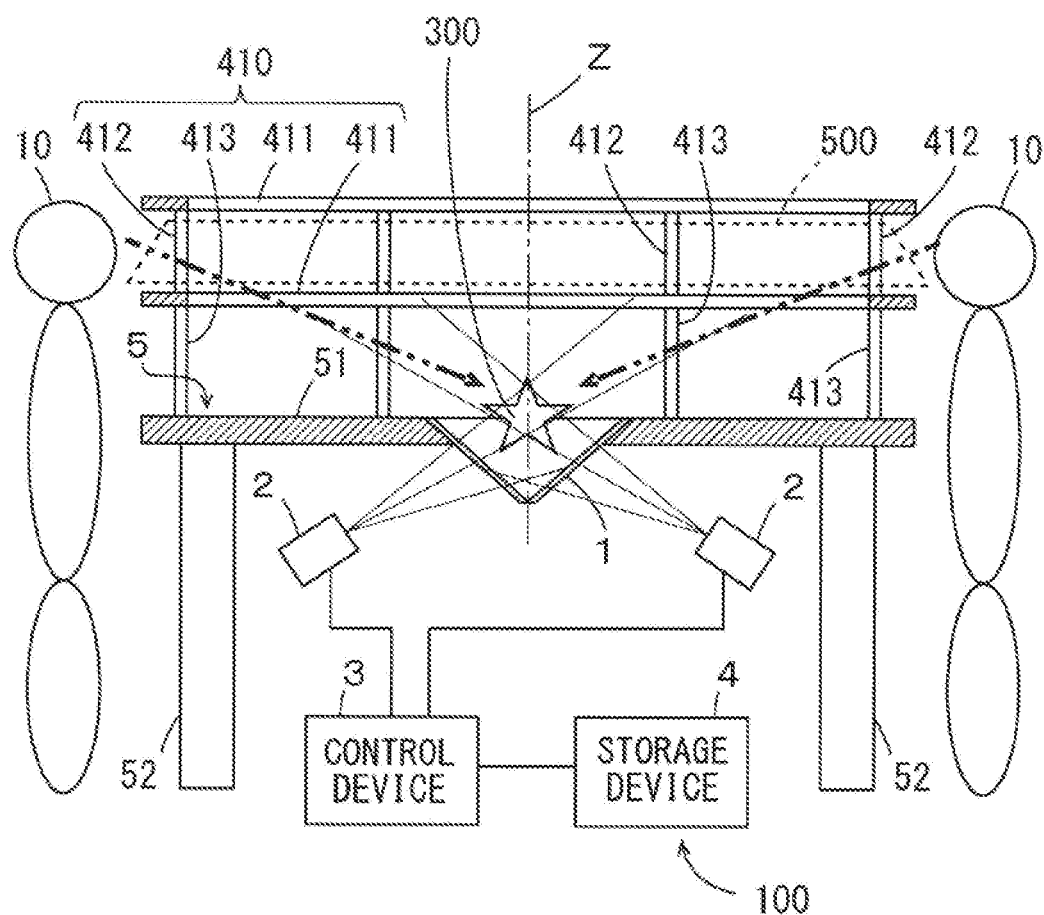

THREE-DIMENSIONAL IMAGE OBSERVATION SYSTEM

TECHNICAL FIELD

The present invention relates to an image observation system with which a three-dimensional image can be viewed.

BACKGROUND ART

Various three-dimensional displays for presenting three-dimensional images have been developed (see Patent Document 1, for example.) In a three-dimensional display, a three-dimensional image is generally presented in a space in front of a screen, a space above the screen or the like.

The three-dimensional display described in Patent Document 1 has a conical light ray controller. The light ray controller is arranged such that a base of the cone opens on a reference plane. A rotation base to which a plurality of scanning projectors are fixed is provided below the reference plane. Each scanning projector irradiates an outer peripheral surface of the light ray controller with a light ray group including a plurality of light rays from outside of the light ray controller while rotating on the rotation base about a rotation axis. The light ray controller transmits each light ray emitted by each scanning projector without diffusing the light ray in a circumferential direction. Thus, a three-dimensional image is displayed above and inside of the conical light ray controller.

[Patent Document 1] JP 2011-48273 A

SUMMARY OF INVENTION

Technical Problem

In the above-mentioned three-dimensional display, the light ray group to be emitted by each scanning projector is controlled by a control device such that a three-dimensional image is displayed when the observer looks above and inside of the light ray controller from a predetermined area (viewing area) surrounding the light ray controller. Therefore, when the positions of the eyes of the observer move out of the viewing area, an incomplete three-dimensional image is viewed. As such, Patent Document 1 describes that the positions of the eyes of the observer are tracked by a camera, and a light ray group is corrected by the control device such that an accurate three-dimensional image is viewed from the positions of the eyes. In this case, the process to be performed by the control device becomes complicated. Therefore, high processing capacity is required for the control device, and the three-dimensional display becomes expensive.

Further, with the above-mentioned method, after all of an imaging process performed by the camera, a process of transferring the acquired image data from the camera to the control device, the process of detecting the positions of the eyes based on the image data, and the process of correcting the light ray group based on the positions of the eyes are performed, a three-dimensional image is presented. Therefore, when a series of processes from the imaging process to the presentation of the three-dimensional image requires a long period of time, the observer views incomplete three-dimensional images during the series of processes (a time length during which two or three frames are displayed, for example). There is a limit to a reduction of the time length required for the above-mentioned series of processes even with the control device having high processing capacity.

An object of the present invention is to provide a three-dimensional image observation system capable of allowing an observer to view an accurate three-dimensional image while an increase in cost is prevented.

Solution to Problem (1) A three-dimensional image observation system according to one aspect of the present invention includes a three-dimensional display that displays a three-dimensional image based on three-dimensional data such that the three-dimensional image is observed from a predefined viewing area that extends in a line shape, and a guide means that visually guides eyes of an observer from an outside of the viewing area to the viewing area.

With this three-dimensional image observation system, the eyes of the observer are visually guided from the outside of the viewing area to the inside of the viewing area. In this case, it is not necessary to perform a complicated process such as correction of a three-dimensional image displayed by the three-dimensional display according to the positions of the eyes of the observer. Therefore, it is not necessary to use an expensive three-dimensional display having high processing capacity to perform the complicated process. As a result, the observer can view an accurate three-dimensional image while an increase in cost is prevented.

(2) The guide means may include an indicator display that displays an image that is viewable by the observer as an indicator with the eyes of the observer inside or outside of the viewing area, and the indicator display may display the indicator such that the indicator is viewed by the observer in a first image quality with the eyes of the observer in the viewing area, and may display the indicator such that the indicator is viewed by the observer in a second image quality that is lower than the first image quality with the eyes of the observer outside of the viewing area.

In this case, the observer moves his or her eyes from the outside of the viewing area to the inside of the viewing area to view the indicator in the higher image quality. Thus, the eyes of the observer are guided to the viewing area.

(3) The first and second image qualities may indicate degrees of deformation of the indicator, a degree of deformation of the indicator in the second image quality may be higher than a degree of deformation of the indicator in the first image quality, and the closer the eyes of the observer are to the viewing area, the lower the degree of deformation of the indicator observed by the observer may be.

In this case, the observer moves his or her eyes from the outside of the viewing area to the inside of the viewing area such that the degree of deformation of the indicator is lowered. Thus, the eyes of the observer are guided to the viewing area.

(4) The first and second image qualities may indicate degrees of deficiency of the indicator, the degree of deficiency of the indicator in the second image quality may be higher than the degree of deficiency of the indicator in the first image quality, and the closer the eyes of the observer are to the viewing area, the lower the degree of deficiency of the indicator observed by the observer may be.

In this case, the observer moves his or her eyes from the outside of the viewing area to the inside of the viewing area such that the degree of deficiency of the indicator is lowered. Thus, the eyes of the observer are guided to the viewing area.

(5) The indicator display may include a projection subject, and an optical system that reflects a light ray from the projection subject to guide the light ray as the indicator to the viewing area, the viewing area may be positioned on one side of a reference plane, and the projection subject may be positioned on another side of the reference plane, and the optical system may form an image of the projection subject as the indicator on the one side, may restrict a path of a light ray from the projection subject such that an entire image of the projection subject is viewed by the observer with the eyes of the observer in the viewing area, and may restrict the path of the light ray from the projection subject such that part of the image or the entire image of the projection subject is not viewed by the observer with the eyes of the observer outside of the viewing area.

In this case, because the projection subject is positioned on the other side of the reference plane, the physical configuration for guiding the eyes of the observer to the viewing area is not provided on the one side of the reference plane. Thus, the space where the viewing area is present can be effectively and practically used.

(6) The guide means may include a frame provided along the viewing area.

In this case, the observer can easily identify the position of the viewing area because of the frame. Thus, when the observer brings his or her eyes close to the frame, the eyes of the observer are guided from the outside of the viewing area to the inside of the viewing area.

Advantageous Effects of Invention

The present invention enables an observer to view an accurate three-dimensional image while an increase in cost is prevented.

BRIEF DESCRIPTION OF THE DRAWINGS

FIG. 1 is a schematic cross sectional view of a three-dimensional image observation system according to a first embodiment.

DESCRIPTION OF EMBODIMENTS

[1] First Embodiment

Figure 2:
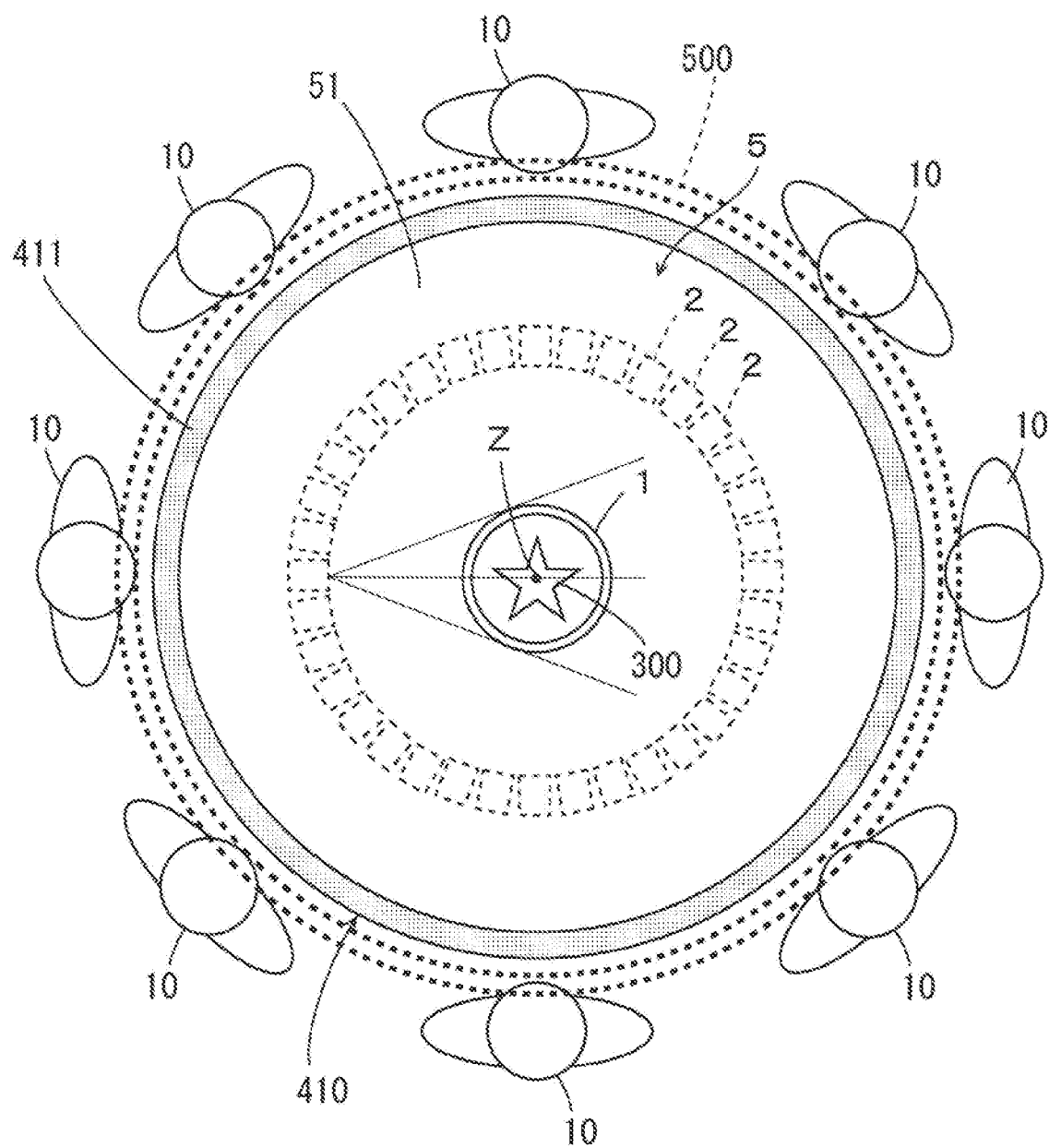
FIG. 2 is a schematic plan view of the three-dimensional image observation system of FIG. 1.
Figure 3:
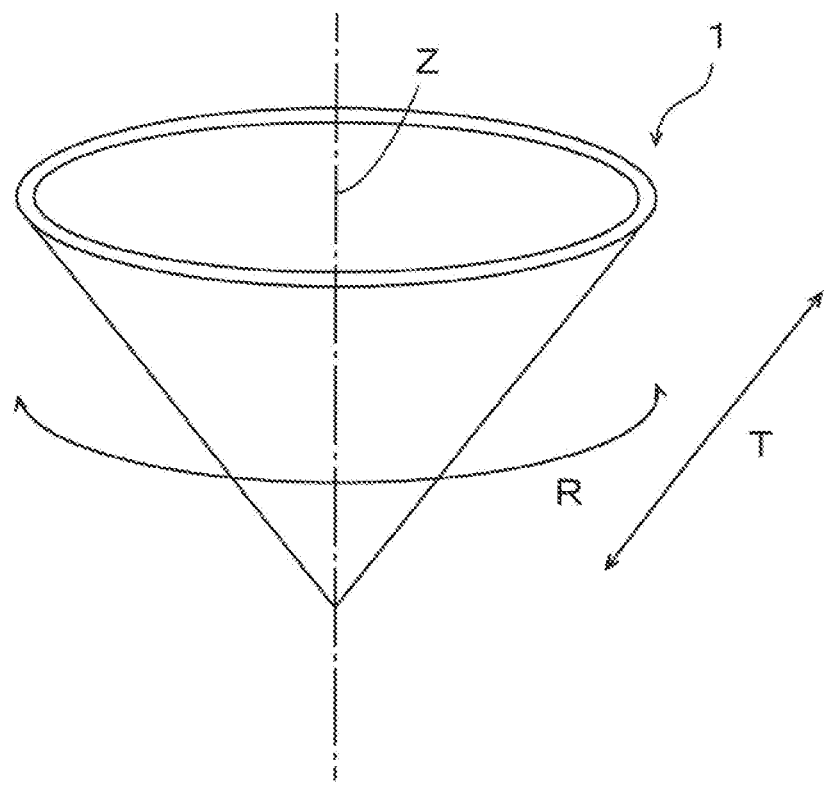
FIG. 3 is a perspective view of a light ray controller used in the three-dimensional image observation system of FIGS. 1 and 2.

A three-dimensional image observation system according to the first embodiment will be described with reference to drawings. FIG. 1 is a schematic cross sectional view of the three-dimensional image observation system according to the first embodiment. FIG. 2 is a schematic plan view of the three-dimensional image observation system of FIG. 1. FIG. 3 is a perspective view of a light ray controller used in the three-dimensional image observation system of FIGS. 1 and 2. As shown in FIG. 1, the three-dimensional image observation system according to the present embodiment includes a three-dimensional display 100 and a guide frame 410.

The three-dimensional display 100 is constituted by the light ray controller 1, a plurality of light ray generators 2, a control device 3 and a storage device 4. Further, the three-dimensional display 100 is provided at the table 5. The table 5 is made of a circular top board 51 and a plurality of legs 52. A circular hole is formed in the center portion of the top board 51.

As shown in FIG. 3, the light ray controller 1 has a rotationally-symmetric cone shape with an axis Z as the center. A base of the light ray controller 1 is open. The light ray controller 1 is formed such that the incident light ray is transmitted while being diffused in a ridge line direction T, and is formed such that the incident light ray is transmitted while not being diffused in a circumferential direction R with the axis Z as the center and travels in a straight line.

As shown in FIG. 1, the light ray controller 1 is fitted into the circular hole in the top board 51 such that the base opening is directed upward. Observers 10 who are around the table 5 can observe an inner peripheral surface of the light ray controller 1 obliquely from above the top board 51 of the table 5.

As shown in FIGS. 1 and 2, the plurality of light ray generators 2 are arranged below the table 5 on a circumference with the axis Z of the light ray controller 1 as the center. The plurality of light ray generators 2 are provided to emit light rays to an outer peripheral surface of the light ray controller 1 obliquely from below the light ray controller 1. Each light ray generator 2 can emit light rays and deflect the light rays in a horizontal plane and a vertical plane. Thus, each light ray controller 2 can scan the outer peripheral surface of the light ray controller 1 with light rays. Here, the light rays refer to the light that does not diffuse and is indicated by straight lines.

The storage device 4 of FIG. 1 is made of a hard disk drive and a memory card, for example. Three-dimensional data for presenting a three-dimensional image 300 is stored in the storage device 4. The control device 3 is made of a personal computer, for example. The control device 3 controls the plurality of light ray generators 2 based on the three-dimensional data stored in the storage device 4. Thus, the three-dimensional image 300 is presented above the light ray controller 1.

In the three-dimensional display 100, the area from which the observers 10 can observe the three-dimensional image 300 is predefined as a viewing area 500. When the eyes of the observers 10 are positioned in the viewing area 500, the observers 10 can observe the entire three-dimensional image 300 without distortion. The viewing area 500 has a specific positional relationship with the light ray controller 1 and the plurality of light ray generators 2. As shown in FIGS. 1 and 2, the viewing area 500 of the present example is an annular strip-form area that surrounds the light ray controller 1 with the axis Z as the center at a position further upward than the top board 51 and has a certain width. While the viewing area 500 of the present example 500 is inclined such that the upper end is closer to the axis Z than the lower end is to the axis Z, the attitude of the viewing area 500 is not limited to this. For example, the viewing area 500 may be defined to be perpendicular to the horizontal plane.

As indicated by the two-dots and dash lines in FIG. 1, the observers 10 can view the accurate three-dimensional image 300 by moving lines of sight towards the light ray controller 1 with their eyes in the viewing area 500. On the other hand, when moving the lines of sight towards the light ray controller 1 with their eyes outside of the viewing area 500, the observers 10 cannot view the accurate three-dimensional image 300. In this case, the observers 10 either cannot identify that the three-dimensional image 300 is displayed, or view the three-dimensional image 300 that is deformed to a shape different from the shape in which the three-dimensional image 300 is originally to be identified, or a three-dimensional image 300 missing a portion, for example.

As such, in the present embodiment, the guide frame 410 is attached to the upper surface of the table 5 as a guide means for guiding the eyes of the observers 10 to the viewing area. As shown in FIGS. 1 and 2, the guide frame 410 includes two annular frames 411, a plurality of coupling shafts 412 and a plurality of columns 413. In FIG. 2, a dotted pattern is applied to one annular frame 411 of the guide frame 410 in order to facilitate understanding of the shape of the guide frame 410.

As shown in FIG. 1, the plurality of coupling shafts 412 couple the two annular frames 411 to each other such that the two annular frames 411 overlap with each other with a certain distance interposed therebetween in a vertical direction.

The plurality of columns 413 support the two annular frames 411 and the plurality of coupling shafts 412 on the table 5 such that the two annular frames 411 are respectively positioned at the height of the upper end of the viewing area 500 and the height of the lower end of the viewing area 500 in the vertical direction.

With the above-mentioned configuration, the observers 10 can easily identify the position of the viewing area 500 because of the guide frame 410. Thus, the observers 10 move their eyes towards the guide frame 410, so that the eyes of the observers 10 are guided from the outside of the viewing area 500 to the inside of the viewing area 500. In this case, it is not necessary to perform a complicated process of correcting the three-dimensional image 300 displayed by the three-dimensional display 100 according to the positions of the eyes of the observers 10. Therefore, it is not necessary to use an expensive three-dimensional display 100 having high processing capacity in order to execute the complicated process. As a result, it is possible to allow the observers 10 to view the accurate three-dimensional image 300 while preventing an increase in cost.

While the two annular frames 411 and the plurality of coupling shafts 412 are supported on the table 5 by the plurality of columns 413 in the above-mentioned example, the present invention is not limited to this. The two annular frames 411 and the plurality of coupling shafts 412 may be supported at the ceiling of the room in which the three-dimensional display 100 is provided, for example.

The above-mentioned annular frames 411 may be denoted with character strings or symbols indicating the position of the viewing area 500, for example. Thus, the eyes of the observers 10 are more smoothly guided to the viewing area 500.

[2] Second Embodiment

Figure 4:
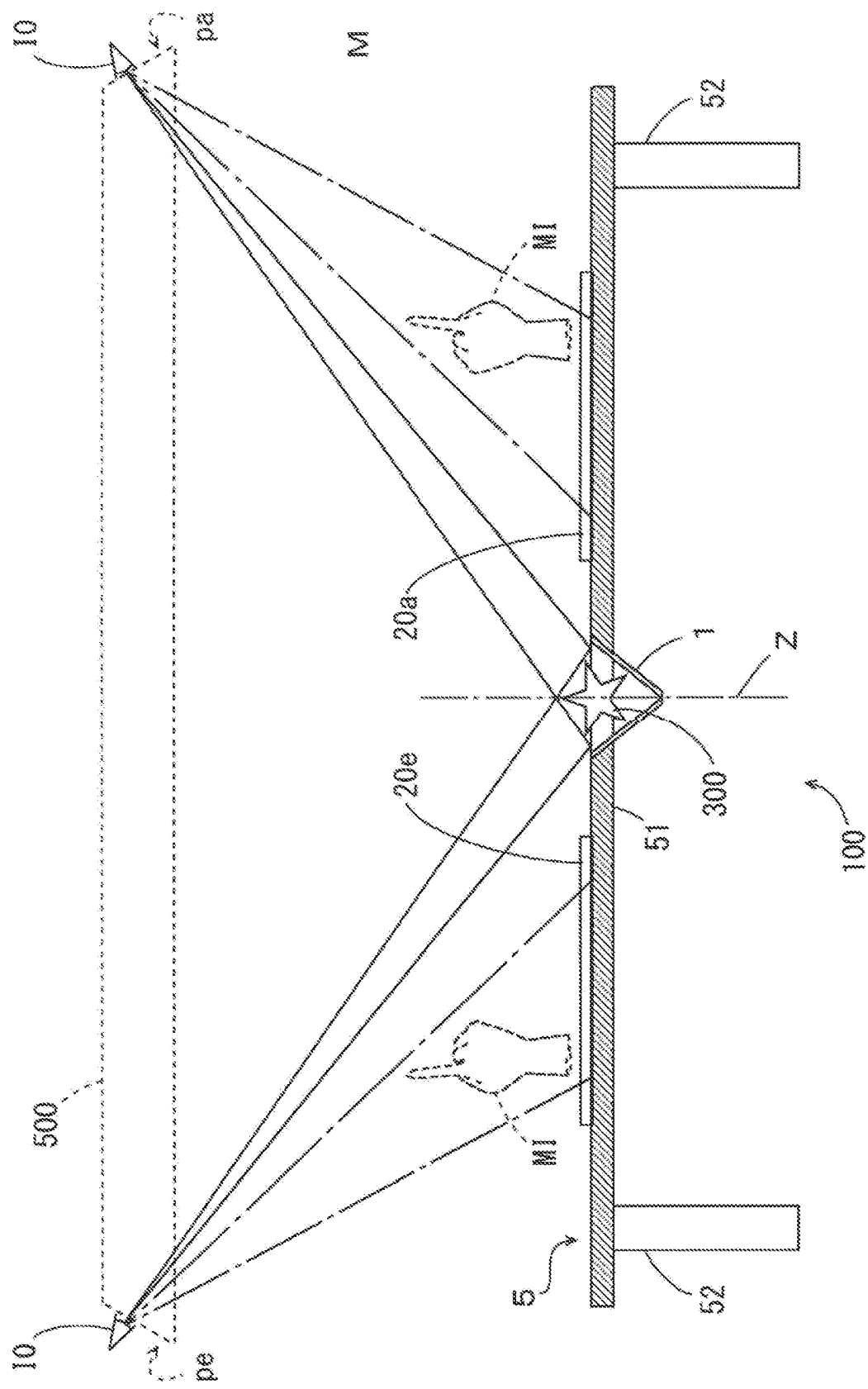
FIG. 4 is a cross sectional view of the three-dimensional image observation system according to a second embodiment.
Figure 5:
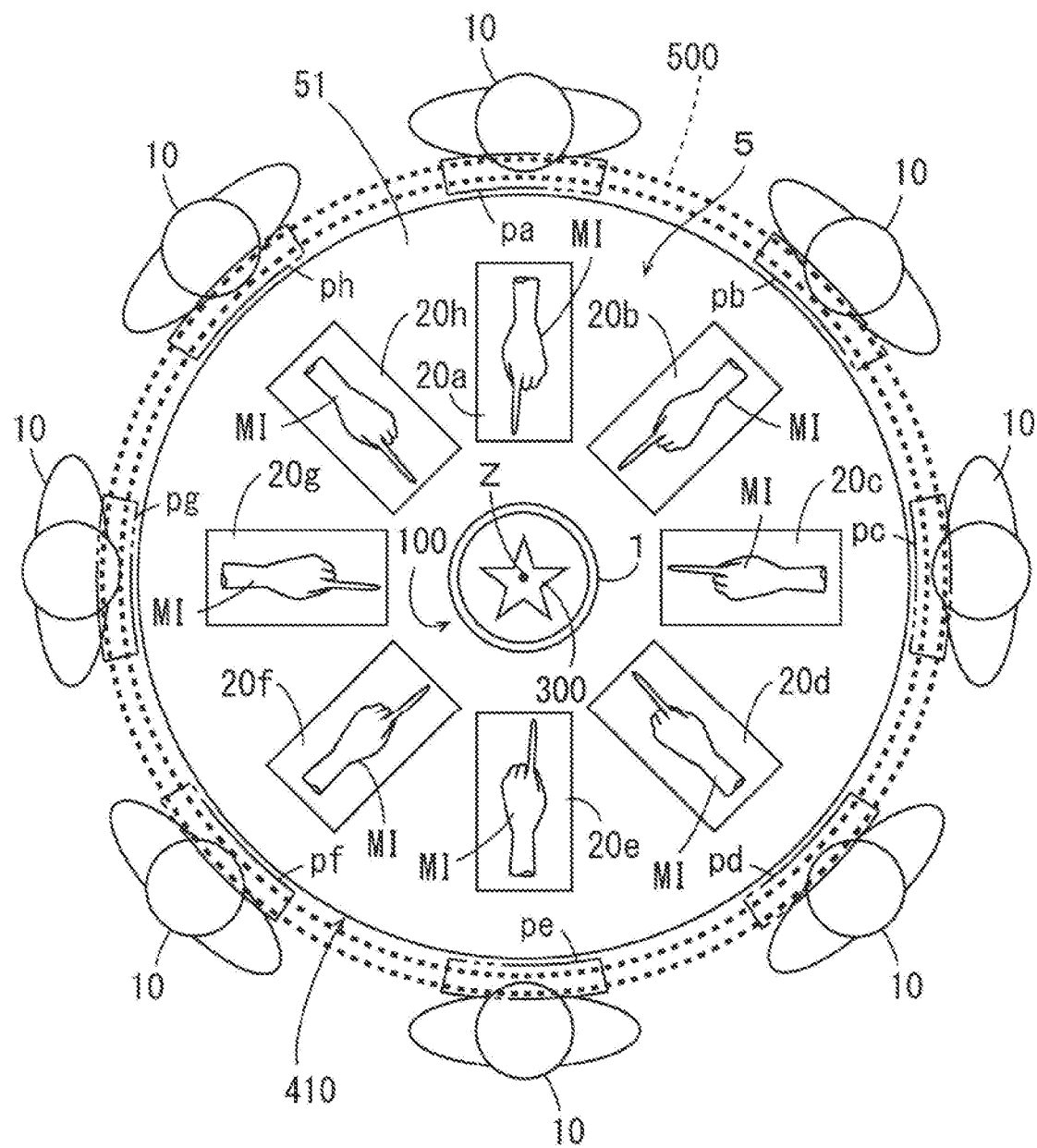
FIG. 5 is a schematic plan view of the three-dimensional image observation system of FIG. 4.

As for a three-dimensional image observation system according to the second embodiment, differences from the three-dimensional image observation system according to the first embodiment will be described. FIG. 4 is a schematic cross sectional view of the three-dimensional image observation system according to the second embodiment. FIG. 5 is a schematic plan view of the three-dimensional image observation system of FIG. 4. The three-dimensional image observation system according to the second embodiment includes the three-dimensional display 100 of FIG. 1. In FIG. 4, the plurality of light ray generators 2, the control device 3 and the storage device 4 of the three-dimensional display 100 are not shown. Further, the three-dimensional image observation system according to the second embodiment includes a plurality (eight in the present example) of guide members 20a to 20h instead of the guide frame 410 of FIG. 1. Each of the guide members 20a to 20h is tabular or sheet-like.

As shown in FIG. 5, a plurality of partial areas pa to ph are defined in a viewing area 500 at equal angular intervals. The plurality of guide members 20a to 20h are arranged on the top board 51 of the table 5 to surround the upper end of a light ray controller 1 at equal angular intervals with the axis Z as the center. Each of the plurality of guide members 20a to 20h is arranged between the axis z and each of the plurality of partial areas pa to ph.

An indicator MI corresponding to the nearest partial area out of the partial areas pa to ph is drawn on the upper surface of each of the guide members 20a to 20h. Each indicator MI is viewed by the observer 10 in a first image quality when the eyes 10 (FIG. 4) of the observer 10 are in the corresponding partial area pa to ph. On the other hand, each indicator MI is viewed by the observer 10 in a second image quality that is lower than the first image quality when the eyes 10 of the observer 10 are outside of the corresponding partial area pa to ph.

In the present embodiment, the image quality means the degree of deformation of the indicator MI. The lower the degree of deformation of the indicator MI is, the higher the image quality of the present example is. The higher the degree of deformation of the indicator MI is, the lower the image quality of the present example is. The indicator MI that is viewed in the first image quality is identified as a three-dimensional image by the observer 10. On the other hand, the indicator MI that is viewed in the second image quality is identified as a distorted planar image by the observer 10. Such indicator MI can be generated using techniques of expression utilizing illusion of human eyes in drawings such as the perspective, and lighting and shading.

FIG. 4 shows one observer 10 viewing the indicator MI on the guide member 20a when the eyes 10 of the observer 10 are in the partial area pa corresponding to the guide member 20a. Further, FIG. 4 shows another observer 10 viewing the indicator MI on the guide member 20e when the eyes 10 of the observer 10 are in the partial area pe corresponding to the guide member 20e. In this case, the observer 10 viewing the respective guide members 20a, 20e view the indicators MI in the first image quality. Thus, the observer 10 identify the indicators MI as if the indicators MI exist on the table 5 three-dimensionally.

On the other hand, when the eyes 10 of the one observer 10 are outside of the partial area pa corresponding to the guide member 20a, the observer 10 views the indicator MI on the guide member 20a in the second image quality. In the present example, the observer 10 identifies the indicator MI as if the indicator MI that is distorted in a lengthily manner exists on the guide member 20a two-dimensionally (see FIG. 5). Further, when the eyes I0 of the other observer 10 are outside of the partial area pe corresponding to the guide member 20e, the observer 10 views the indicator MI on the guide member 20e in the second image quality. In the present example, the observer 10 identifies the indicator MI as if the indicator MI that is distorted in a lengthily manner exists on the guide member 20e two-dimensionally.

In these cases, each observer 10 moves their eyes I0 from the outside of the viewing area 500 to the inside of the viewing area 500 in order to view the indicator MI in a higher image quality. Thus, the eyes I0 of each observer 10 are guided to the viewing area 500. As each guide member 20a to 20h, a metallic or wooden planar member on which the indicator MI is drawn, a piece of paper on which the indicator MI is drawn or the like can be used.

A sheet-like member having optical characteristics with which the indicator MI is viewed differently according to the positions of the eyes I0 of the observer 10 may be provided on each guide member 20a to 20h. For example, the sheet-like member having a microlouver structure may be provided on each guide member 20a to 20h. The sheet-like member having the microlouver structure is generally used as a privacy filter to be attached onto a display panel of a tablet, a smartphone or the like.

In this case, the range, which includes the partial area corresponding to each guide member 20a to 20h and the one or plurality of areas that are adjacent to the partial area, can be set as the area from which the indicator MI on each guide member 20a to 20h can be viewed in the second image quality. Thus, the number of indicators MI to be viewed by the observer 10 simultaneously can be smaller than the number of the plurality of guide members 20a to 20h. Therefore, the eyes I0 of the observer 10 are guided to the viewing area 500 by the appropriate indicator MI corresponding to the positions of the eyes I0 of the observer 10.

Alternatively, a sheet-like member having the lenticular structure may be provided on each guide member 20a to 20h. In this case, the image including a plurality of indicators MI corresponding to the sheet-like member is drawn on each guide member 20a to 20h. With this configuration, it is possible to allow a plurality of observers 10 to respectively identify the plurality of different indicators MI corresponding to the positions of the eyes I0 of the plurality of observers 10 in each guide member 20a to 20h.

Figure 6:
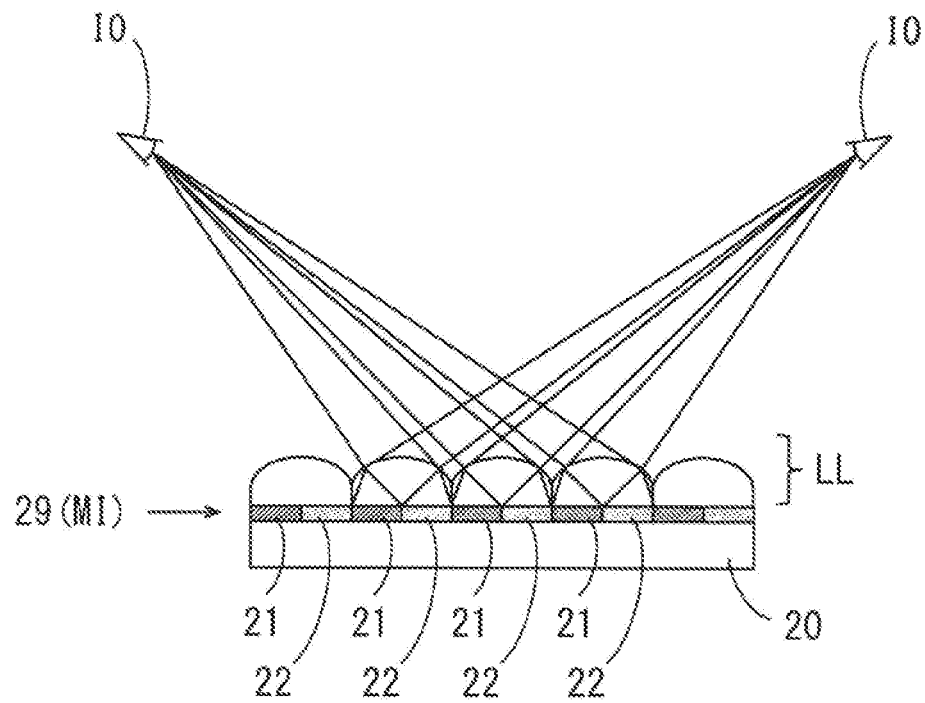
FIG. 6 is a conceptual diagram showing a method of presenting a plurality of indicators using a sheet-like member having the lenticular structure.

FIG. 6 is a conceptual diagram showing the method of presenting the plurality of indicators MI using the sheet-like member having the lenticular structure. As shown in FIG. 6, a parallax image 29 is provided on the upper surface of the guide member 20 as the image including two indicators MI, for example. The parallax image 29 of the present example is formed when the two indicators MI that are different from each other are respectively divided into strips in one direction, and strip-form images 21 of the one indicator MI and strip-form images 22 of the other indicator MI are arranged alternately in one direction. In FIG. 6, the strip-form images 21 of the one indicator MI are indicated by hatching, and the strip-form images 22 of the other indicator MI are indicated by a dotted pattern.

A lenticular lens LL is provided on the parallax image 29. The lenticular lens LL includes a plurality of semi-cylindrical convex lenses. Each convex lens is provided to correspond to each set of two adjacent strip-form images 21, 22, guides the light from the strip-form images 21 to the eyes I0 of one observer 10 and guides the light from the strip-form images 22 to the eyes I0 of another observer 10. Thus, the one observer 10 can view the strip-form images 21, and the other observer 10 can view the strip-form images 22.

Alternatively, a sheet-like member having the parallax barrier structure may be provided on each guide member 20a to 20h. In this case, the image including a plurality of indicators MI corresponding to the sheet-like member is drawn on each guide member 20a to 20h. With this configuration, it is possible to allow a plurality of observers 10 to respectively identify the plurality of different indicators MI according to the positions of the eyes I0 of the plurality of observers 10.

Figure 7:
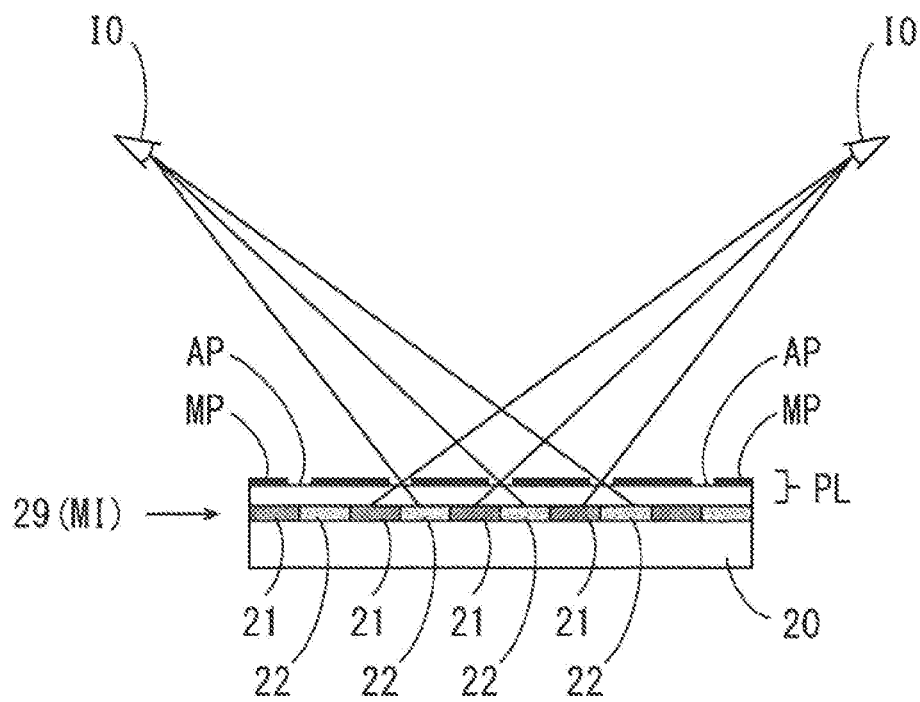
FIG. 7 is a conceptual diagram showing a method of presenting a plurality of indicators using a sheet-like member having the parallax barrier structure.

FIG. 7 is a conceptual diagram showing the method of presenting the plurality of indicators MI using the sheet-like member having the parallax barrier structure. As shown in FIG. 7, the parallax image 29 of FIG. 6 is provided on the upper surface of the guide member 20 as the image including the two indicators MI, for example.

A parallax barrier PL is provided on the parallax image 29. A mask pattern MP including a plurality of slit-like openings AP is formed in the parallax barrier PL. Each opening AP is provided to correspond to a set of two adjacent strip-form images 21, 22.

The light from the strip-form images 21 is guided to the eyes I0 of one observer 10 through the openings AP of the mask pattern MP, and the light from the strip-form images 22 is guided to the eyes I0 of another observer 10 through the openings AP of the mask pattern MP. Thus, the one observer 10 can view the strip-form images 21, and the other observer 10 can view the strip-form images 22.

As described above, it is possible to allow the plurality of observers 10 to respectively view the plurality of different indicators MI using one guide member according to the positions of the eyes I0 by using the sheet-like member having the lenticular structure or the parallax barrier structure.

Figure 8:
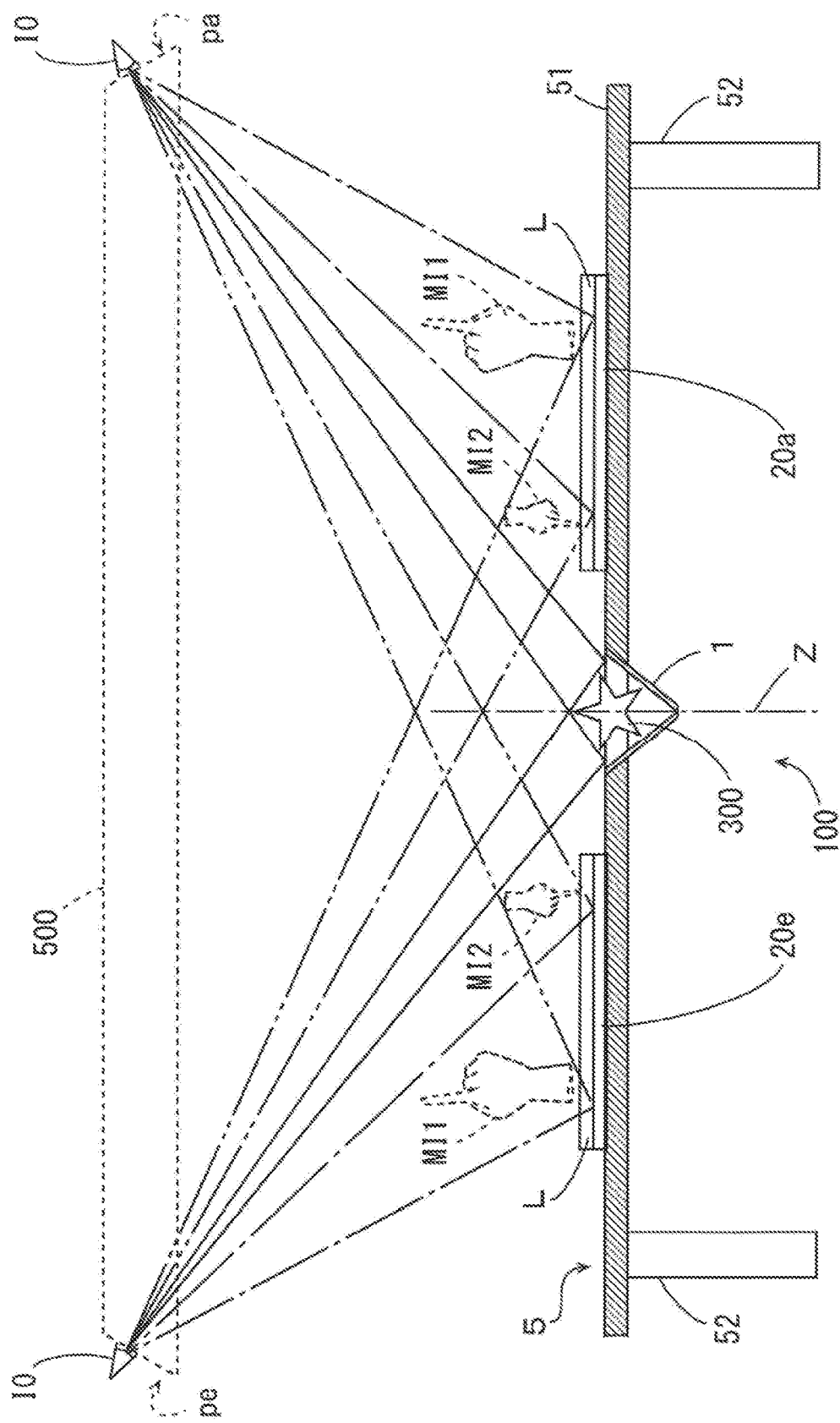
FIG. 8 is a schematic cross sectional view showing an example in which a sheet-like member having the lenticular structure or the parallax barrier structure is applied to the three-dimensional image observation system of FIGS. 4 and 5.

FIG. 8 is a schematic cross sectional view showing the example in which a sheet-like member having the lenticular structure or the parallax barrier structure is applied to the three-dimensional image observation system of FIGS. 4 and 5. A parallax image including two indicators MI1, MI2 is provided on the upper surface of each guide member 20a to 20h. One of the two indicators MI1, MI2 corresponds to the nearest partial area out of the partial areas pa to ph, and the other one of the two indicators MI1, MI2 corresponds to the farthest partial area out of the partial areas pa to ph. The sheet-like member L having the lenticular structure or the parallax barrier structure is provided on the parallax image.

In the example of FIG. 8, when the eyes I0 of one observer 10 are in the partial area pa, the observer 10 identifies the one indicator MI1 of the parallax image on the guide image 20a three-dimensionally, and identifies the one indicator MI2 of the parallax image on the guide member 20e three-dimensionally. Further, when the eyes I0 of another observer 10 are in the partial area pe, the observer 10 identifies the other indicator MI2 of the parallax image on the guide image 20a three-dimensionally, and identifies the other indicator MI1 of the parallax image on the guide member 20e three-dimensionally. Thus, the eyes I0 of the observer 10 are guided to the viewing area 500 by the plurality of indicators MI1, MI2 that appear at a plurality of positions spaced apart from one another.

With the sheet-like member having the lenticular structure or the parallax barrier structure, the positions from which the plurality of indicators MI drawn on each guide member 20a to 20h can be viewed can be set in a plurality of areas different from one another. For example, the parallax image including the plurality of indicators MI corresponding to the distance between the eyes I0 of the observer 10 and the viewing area 500 is drawn in each guide member 20a to 20h. Further, a sheet-like member is provided on the parallax image such that the plurality of indicators MI are respectively viewed from the plurality of areas. In this case, the eyes I0 of the observer 10 are smoothly guided to the viewing area 500 by the plurality of indicators MI corresponding to the distance between the observer 10 and the viewing area 500.

While the eight guide members 20a to 20h are provided on the table as guide means for guiding the eyes of the observers 10 to the viewing area in the above-mentioned example, the present invention is not limited to this. The number of guide members provided in the three-dimensional image observation system is not limited to eight. The number of guide members may be not more than one and not less than seven, or may be not less than nine.

While the plurality of guide members 20a to 20h on which the indicators MI are drawn are used as the guide means for guiding the eyes of the observers 10 to the viewing area in the above-mentioned example, the present invention is not limited to this. The display device including a display panel such as a liquid crystal display panel or an organic EL (Electroluminescence) panel may be used instead of the guide members 20a to 20h. In this case, a plurality of display panels are provided on the top board 51 instead of the plurality of guide members 20a to 20h, for example. Thus, a desired indicator MI can be easily displayed on each display panel.

Alternatively, a plurality of areas on the upper surface of the top board 51 of the table 5 may be used as upper surfaces of the guide members 20a to 20h. In this case, desired indicators MI may be displayed on the plurality of areas on the upper surface of the top board 51 using a projector, for example.

The three-dimensional image observation system according to the present embodiment may include the guide frame 410 according to the first embodiment in addition to the above-mentioned configuration. Thus, the eyes of the observers 10 are guided from the outside of the viewing area 500 to the inside of the viewing area 500 by the plurality of guide members 20a to 20h and the guide frame 410.

[3] Third Embodiment

Figure 9:
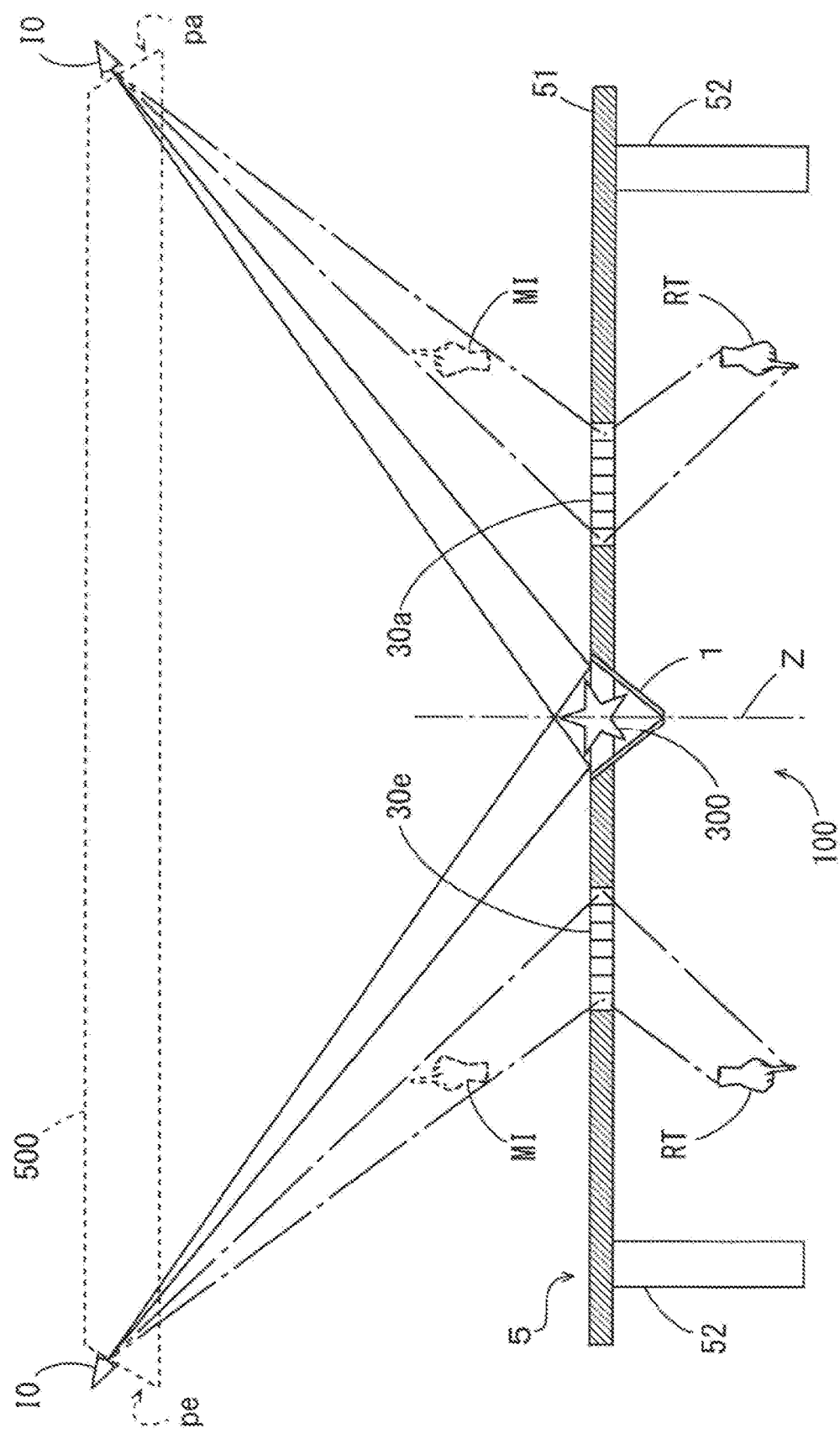
FIG. 9 is a schematic cross sectional view of a three-dimensional image observation system according to a third embodiment.
Figure 10:
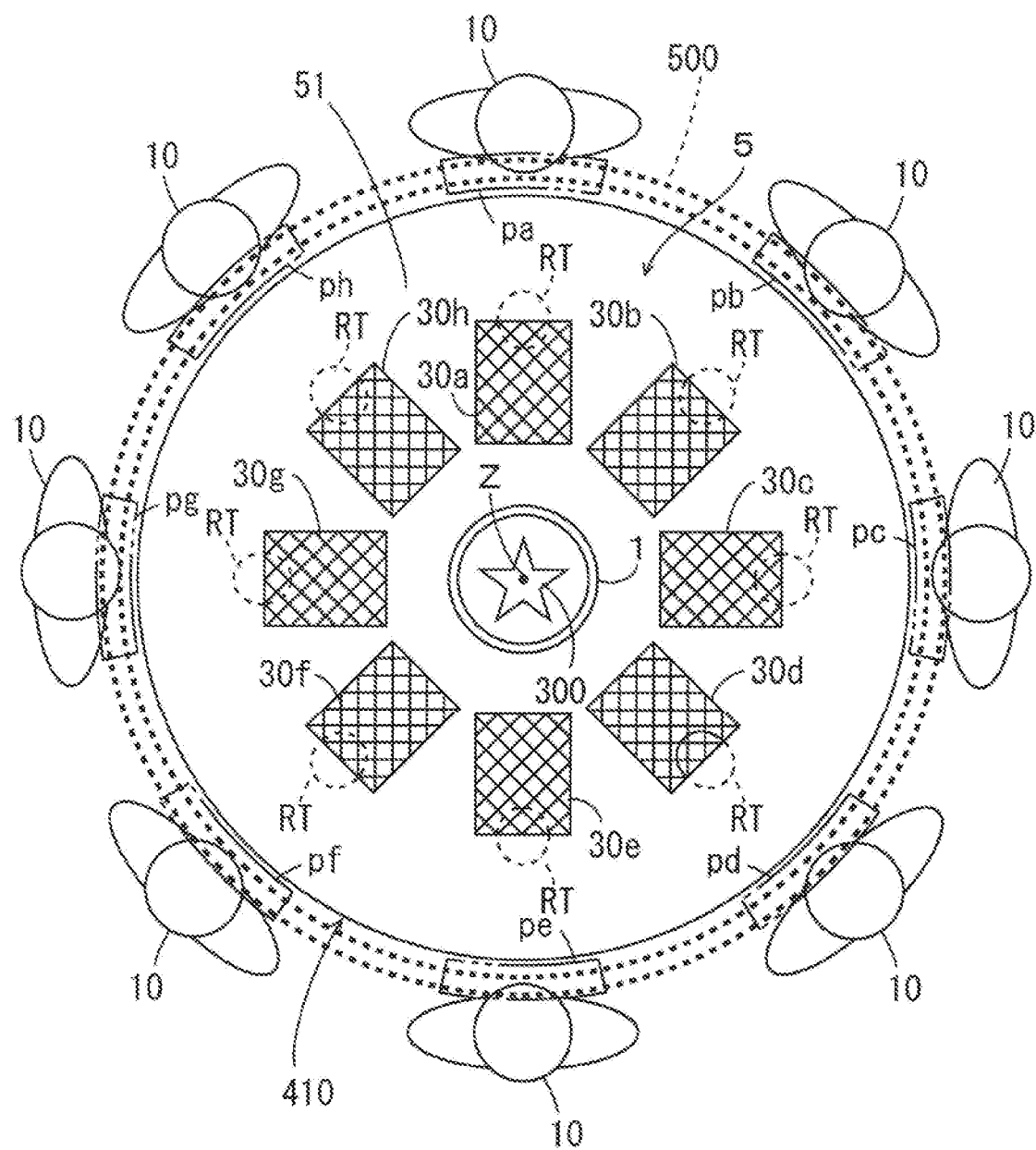
FIG. 10 is a schematic plan view of the three-dimensional image observation system of FIG. 9.

As for a three-dimensional image observation system according to the third embodiment, differences from the three-dimensional image observation system according to the first embodiment will be described. FIG. 9 is a schematic cross sectional view of the three-dimensional image observation system according to the third embodiment. FIG. 10 is a schematic plan view of the three-dimensional image observation system of FIG. 9. The three-dimensional image observation system according to the third embodiment includes the three-dimensional display 100 of FIG. 1. In FIG. 9, the plurality of light ray generators 2, the control device 3 and the storage device 4 of the three-dimensional display 100 are not shown. Further, the three-dimensional image observation system according to the third embodiment further includes a plurality (eight in the present example) of imaging optical systems 30a to 30h and a plurality of projection subjects RT corresponding to the plurality of imaging optical systems 30a to 30h instead of the guide frame 410 of FIG. 1.

As shown in FIG. 10, a plurality of partial areas pa to ph are defined in the viewing area 500 at equal angular intervals. A circular hole is formed in the center portion of the top board 51 of the table 5, and a plurality of rectangular holes are formed to surround the circular hole. As described above, the light ray controller 1 is fitted into the circular hole. The plurality of imaging optical systems 30a to 30h are fitted into the plurality of rectangular holes in the top board 51. Each of the plurality of imaging optical systems 30a to 30h is arranged between an axis z and each of the plurality of partial areas pa to ph. The plurality of projection subjects RT respectively corresponding to the plurality of imaging optical systems 30a to 30h are provided at positions lower than the top board 51. Each imaging optical system 30a to 30h corresponds to a projection subject RT and a nearest partial area out of the plurality of partial areas pa to ph.

Each imaging optical system 30a to 30h reflects a light ray from the corresponding projection subject RT, and forms a real image of the projection subject RT above the top board 51 as an indicator MI. Each indicator MI is viewed by the observer 10 in the first image quality when the eyes I0 of the observer 10 are in the corresponding partial area pa to ph. On the other hand, each indicator MI is viewed by the observer 10 in the second image quality that is lower than the first image quality when the eyes I0 of the observers 10 are outside of the corresponding partial area pa to ph.

In the present embodiment, the image quality means the degree of deficiency of the indicator MI. The lower the degree of deficiency of the indicator MI is, the higher the image quality of the present example is. The higher the degree of deficiency of the indicator MI is, the lower the image quality of the present example is. The indicator MI that is viewed in the first image quality is identified as the entire image of the projection subject RT by the observer 10. On the other hand, the indicator MI that is viewed in the second image quality is not viewed by the observer 10 at all or is identified as a partial image of the projection subject RT by the observer 10.

FIG. 9 shows one observer 10 viewing the image of the indicator MI formed on the imaging optical system 30a when the eyes I0 of the observer 10 are in the partial area pa corresponding to the imaging optical system 30a. Further, FIG. 9 shows another observer 10 viewing the image of the indicator MI formed on the imaging optical system 30e when the eyes I0 of the other observer 10 are in the partial area pe corresponding to the imaging optical system 30e. In this case, the observers 10 respectively viewing the imaging optical systems 30a, 30e view the indicators MI in the first image quality. Thus, the observer 10 identify the indicators MI as if the indicators MI without deficiency are floating above the imaging optical systems 30a, 30e.

On the other hand, when the eyes I0 of the one observer 10 are outside of the partial area pa corresponding to the imaging optical system 30a, the observer 10 views the image of the indicator MI formed on the imaging optical system 30a in the second image quality. Alternatively, the observer 10 does not view the image of the indicator MI formed on the imaging optical system 30a. In the present example, when viewing the indicator MI in the second image quality, the observer 10 identifies the indicator MI as if the indicator MI with partial deficiency is floating above the imaging optical system 30a. Further, when the eyes I0 of the other observer 10 are outside of the partial area pe corresponding to the imaging optical system 30e, the observer 10 views the image of the indicator MI formed on the imaging optical system 30e in the second image quality. Alternatively, the observer 10 does not view the image of the indicator MI formed on the imaging optical system 30e. In the present example, when viewing the indicator MI in the second image quality, the observer 10 identifies the indicator MI as if the indicator MI with partial deficiency is floating above the imaging optical system 30e.

As described above, each imaging optical system 30a to 30h of the present example restricts the paths of the light rays from the projection subject RT such that the entire image of the projection subject RT is viewed by the observers 10 with the eyes I0 of the observer 10 in the corresponding partial area pa to ph, and restricts the paths of the light rays from the projection subject RT such that the partial or entire image of the projection subject RT is not viewed by the observer 10 with the eyes I0 of the observer 10 outside of the corresponding partial area pa to ph.

Each imaging optical system 30a to 30h has the following basic configuration, for example, in order to implement this function. A reference plane is set in each imaging optical system 30a to 30h. Each imaging optical system 30a to 30h includes a plurality of two-plane corner reflectors having two micromirrors that are perpendicular to each other. The plurality of two-plane corner reflectors are arranged on the reference plane such that each micromirror is in a substantially perpendicular attitude with respect to the reference plane.

Each two-plane corner reflector transmits the light ray that is incident on the reference plane from one side of the reference plane to the other side of the reference plane while reflecting the light ray by the two micromirrors. Thus, a real image of the projection subject RT arranged on the one side of the reference plane is formed at a plane-symmetric position of the projection subject RT with respect to the reference plane. In the present example, each imaging optical system 30a to 30h is provided such that the reference plane is in parallel to the top board 51.

With the three-dimensional image observation system according to the present embodiment, each observer 10 moves his or her eyes from the outside of the viewing area 500 to the inside of the viewing area 500 in order to view the indicator MI in the higher image quality. Thus, the eyes I0 of the observer 10 are guided to the viewing area 500.

Further, with the above-mentioned configuration, the projection subject RT is positioned below the top board 51, so that the physical configuration for guiding the eyes I0 of the observers 10 to the viewing area 500 is not provided above the top board 51. Therefore, the space above the top board 51 can be effectively and practically used.

While the eight imaging optical systems 30a to 30h are used as the configuration for allowing the observers 10 to identify the indicators MI three-dimensionally in the above-mentioned example, the present invention is not limited to this. The number of imaging optical systems provided in the three-dimensional image observation system is not limited to eight. The number of imaging optical systems may be not less than one and not more than seven, or may be not less than nine.

While the three-dimensional projection subject RT is provided below the top board 51 in order to allow the observers 10 to identify the indicators MI three-dimensionally in the above-mentioned example, the present invention is not limited to this. In the examples of FIGS. 9 and 10, a display device may be provided at a position where the projection object RT is to be provided instead of the projection subject RT, and a two-dimensional image showing the indicator MI may be provided on the display device.

The three-dimensional image observation system according to the present embodiment may include the guide frame 410 according to the first embodiment in addition to the above-mentioned configuration. Thus, the eyes I0 of the observers 10 are guided from the outside of the viewing area 500 to the inside of the viewing area 500 by the plurality of imaging optical systems 30a to 30h and the guide frame 410.

[4] Other Embodiments (1) While the light ray controller 1 is conical in the above-mentioned embodiment, the present invention is not limited to this. The light ray controller 1 may be frustoconical or cylindrical. Also in these cases, the viewing area 500 is defined to be annular to surround the light ray controller 1 when being viewed in the direction of the central axis of the light ray controller 1 similarly to the above-mentioned embodiment.

(2) While the light ray controller 1 is conical in the above-mentioned embodiment, the present invention is not limited to this. The light ray controller 1 may be rectangular sheet-like. In this case, the viewing area 500 is defined to be in a straight-line shape.

(3) In the three-dimensional display 100 according to the above-mentioned embodiment, the three-dimensional image 300 is presented above the light ray controller 1 when the light rays scan the outer peripheral surface of the light ray controller 1. However, the present invention is not limited to this. The three-dimensional display that displays a three-dimensional image may predefine the viewing area extending linearly (a straight line, an annulus, a curved line or the like) for viewing of the three-dimensional image.

The three-dimensional display may include a disk-shape screen, a rotation driver and a projector, for example, instead of the configuration of the three-dimensional display 100 described in the above-mentioned embodiment. The screen has the function of transmitting the incident light ray while deflecting the incident light ray in a predetermined direction. This function is implemented by use of hologram, prism, a vision restriction film or the like.

The rotation driver rotates the screen about a vertical axis passing through its center. The projector is arranged on one side of the rotating screen. In this state, a light ray group is emitted from the projector towards the screen using time division while being synchronized with the rotation of the screen. At this time, each light ray incident on the screen is transmitted through the screen while being deflected. Thus, a three-dimensional image is displayed (played) at a position on the other side of the screen based on the deflected light ray group. Also in this three-dimensional display, the linear area from which the three-dimensional image can be viewed by the observers 10 is predefined as a viewing area. Therefore, with the eyes I0 of the observers 10 in the viewing area, the three-dimensional image is presented to the observers 10.

(4) While the plurality of light ray generators 2 used in the three-dimensional display 100 are fixed to the circumference with the axis Z of the light ray controller 1 as the center below the table 5 in the above-mentioned embodiment, the present invention is not limited to this.

A rotation mechanism for cyclically rotating a plurality of light ray generators 2 in a certain period with the axis Z as the central axis may be provided below the table 5. In this case, each light ray generator 2 can allow light rays to scan a plurality of portions in the circumferential direction R in the light ray controller 1. As such, the control device 3 controls each light ray generator 2 using time division according to the rotation speeds of the plurality of light ray generators 2 rotated by the rotation mechanism, thereby displaying the three-dimensional image 300 in the space above the light ray controller 1 based on the three-dimensional data.

With this configuration, the number of light ray generators 2 used in the three-dimensional display 100 can be reduced. Further, because each light ray generator 2 irradiates the outer peripheral surface of the light ray controller 1 with a light ray group while rotating, even when there are few light ray generators 2, the continuous three-dimensional image 300 not missing a portion in the circumferential direction R is presented.

(5) In the second embodiment, the lenticular lens LL is provided on each guide member 20a to 20h, for example, in order to allow the plurality of observers 10 to respectively identify the plurality of different indicators MI according to the positions of the eyes I0 of the plurality of observers 10. However, the present invention is not limited to this. A lens array may be provided on each guide member 20a to 20h instead of the lenticular lens LL provided on each guide member 20a to 20h. In this case, a parallax image including a plurality of images corresponding to the lens array is provided on each guide member 20a to 20h. Thus, it is possible to allow the observers 10 to view the larger number of indicators MI corresponding to the positions of the eyes by using the principle of integral imaging. Therefore, the eyes I0 of the observers 10 are more efficiently guided to the viewing area 500 by the large number of indicators MI.

While the parallax barrier PL, for example, is provided on each guide member 20a to 20h in order to allow the plurality of observers 10 to respectively identify the plurality of different indicators MI according to the positions of the eyes I0 of the plurality of observers 10 in the second embodiment, the present invention is not limited to this. A mask pattern in which a plurality of openings are formed to be arranged in two directions (to be arranged in a two-dimensional direction) that intersect with each other may be provided on each guide member 20a to 20h instead of the provision of the parallax barrier PL on each guide member 20a to 20h. In this case, each opening is circular, oval, quadrate or rectangular, polygonal, for example. Further, the plurality of openings are arranged in a matrix shape, for example. In this case, a parallax image including a plurality of images corresponding to the mask pattern is provided on each guide member 20a to 20h. Thus, it is possible to allow the observers 10 to view the larger number of indicators MI according to the positions of the eyes by using the principle similar to the principle of integral imaging. Therefore, the eyes I0 of the observer 10 are more efficiently guided to the viewing area 500 by the large number of indicators MI.

[5] Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the viewing area 500 is a viewing area, the three-dimensional image 300 is an example of a three-dimensional image, the three-dimensional display 100 is an example of a three-dimensional display, the observer 10 is an example of an observer, the eyes I0 of the observer 10 are an example of eyes of the observer, the guide frame 410, the guide members 20a to 20h and the imaging optical system 30a to 30h are examples of a guide means, and the three-dimensional image observation system is an example of a three-dimensional image observation system.

Further, the guide members 20a to 20h, the imaging optical systems 30a to 30h and the projection subject RT are examples of an indicator display, the projection subject RT is an example of a projection subject, the imaging optical systems 30a to 30h are an example of an optical system, and the annular frame 411 of the guide frame 410 is an example of a frame.

As each of constituent elements recited in the claims, various other elements having configurations or functions described in the claims can be also used.

INDUSTRIAL APPLICABILITY

The present invention can be effectively utilized for various three-dimensional displays that display three-dimensional images.

The invention claimed is:

1. A three-dimensional image observation system comprising:
   a three-dimensional display that displays a three-dimensional image based on three-dimensional data such that the three-dimensional image is observed from a predefined viewing area that extends in a line shape; and
   a guide that visually guides eyes of an observer from an outside of the viewing area to the viewing area, wherein
   the guide includes an indicator display that displays an image that is viewable by the observer as an indicator with the eyes of the observer inside or outside of the viewing area, and
   the indicator display displays the indicator such that the indicator is viewed by the observer in a first image quality with the eyes of the observer inside of the viewing area, and displays the indicator such that the indicator is viewed by the observer in a second image quality that is lower than the first image quality with the eyes of the observer outside of the viewing area.

2. The three-dimensional image observation system according to claim 1, wherein
   the first and second image qualities indicate degrees of deformation of the indicator, a degree of deformation of the indicator in the second image quality is higher than a degree of deformation of the indicator in the first image quality, and the closer the eyes of the observer are to the viewing area, the lower the degree of deformation of the indicator observed by the observer is.

3. The three-dimensional image observation system according to claim 1, wherein
   the first and second image qualities indicate degrees of deficiency of the indicator, the degree of deficiency of the indicator in the second image quality is higher than the degree of deficiency of the indicator in the first image quality, and the closer the eyes of the observer are to the viewing area, the lower the degree of deficiency of the indicator observed by the observer is.

4. The three-dimensional image observation system according to claim 3, wherein
   the indicator display includes a projection subject, and an optical system that reflects a light ray from the projection subject to guide the light ray as the indicator to the viewing area,
   the viewing area is positioned on one side of a reference plane, and the projection subject is positioned on another side of the reference plane, and
   the optical system forms an image of the projection subject as the indicator on the one side, restricts a path of a light ray from the projection subject such that an entire image of the projection subject is viewed by the observer with the eyes of the observer inside of the viewing area, and restricts the path of the light ray from the projection subject such that part of the image or the entire image of the projection subject is not viewed by the observer with the eyes of the observer outside of the viewing area.

5. The three-dimensional image observation system according to claim 1, wherein
the guide includes a frame provided along the viewing area.

6. A Three-dimensional image observation system, comprising:
a three-dimensional display that displays a three-dimensional image based on three-dimensional data such that the three-dimensional image is observed from a predefined viewing area that extends in a line shape; and
a guide that visually guides eyes of an observer from an outside of the viewing area to the viewing area,
wherein the guide is arranged between the viewing area and the three-dimensional image and includes a frame provided along the viewing area.

* * * * *